No. 751,119. PATENTED FEB. 2, 1904.
A. D. THOMAS.
COTTON PRESS.
APPLICATION FILED JAN. 29, 1903.
NO MODEL. 2 SHEETS—SHEET 2.
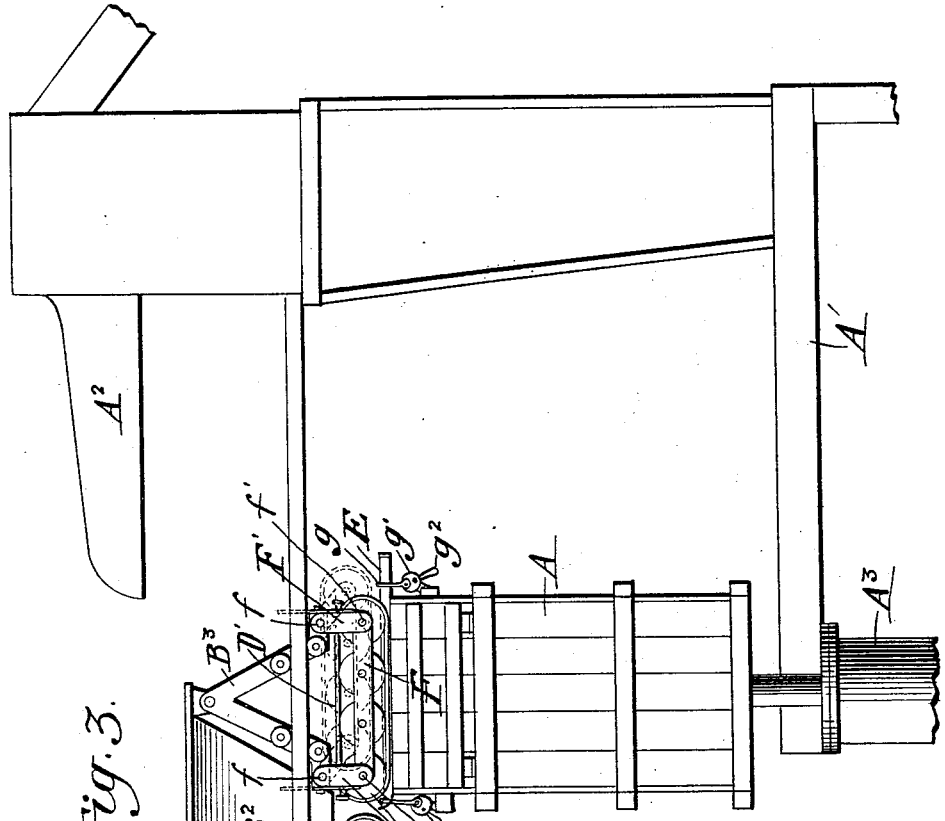
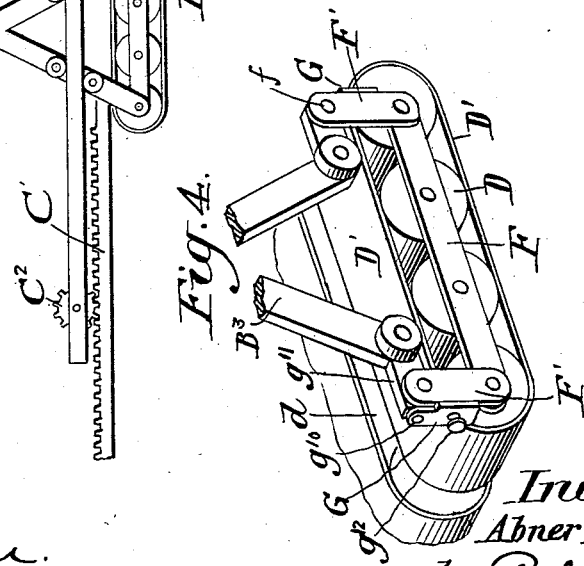
Witnesses:
D. W. Edelin.
G. Harveycutter.
Inventor:
Abner D. Thomas.
by Robt. P. Harris.
Atty.

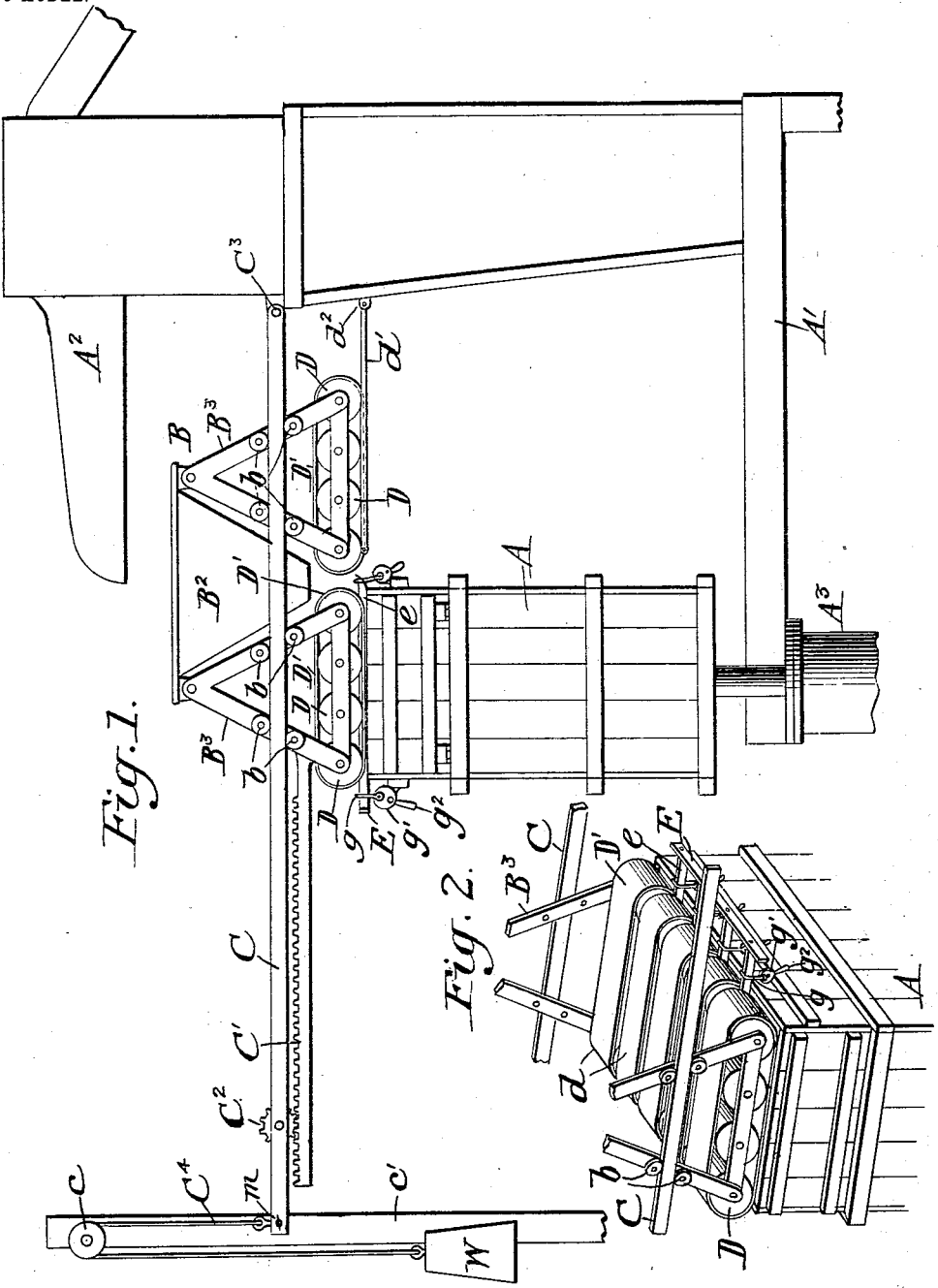

No. 751,119. Patented February 2, 1904.

UNITED STATES PATENT OFFICE.

ABNER D. THOMAS, OF LITTLE ROCK, ARKANSAS.

COTTON-PRESS.

SPECIFICATION forming part of Letters Patent No. 751,119, dated February 2, 1904.

Application filed January 29, 1903. Serial No. 141,028. (No model.)

*To all whom it may concern:*

Be it known that I, ABNER D. THOMAS, a citizen of the United States, residing at Little Rock, in the county of Pulaski and State of Arkansas, have invented certain new and useful Improvements in Cotton-Presses, of which the following is a specification, reference being had to the accompanying drawings, forming a part thereof.

The invention to be hereinafter described relates to cotton-presses, and more particularly to that type of such presses wherein the cotton is assembled in layers in a baling box or chamber under any desired degree of compression and thereafter transferred to the finishing side of the press for any desired pressure, or it may be for final compression into a compact bale for shipment, and is designed as an improvement over the devices described in my prior patent, No. 699,935.

It is the usual practice at the present time to bale the cotton at the gin-house in large but loosely-packed bales, which are transferred to distant points and compressed to the size and density desired by heavy and powerful compresses; but this method of baling necessitates repeated handling of the cotton, first, in the production of the loose bale at the gin and, second, in the shipment to the central or distant point for compression. To obviate these obvious objections, attempts have been made to provide a baling-press that could assemble the cotton in layers under more or less compression as it came from the gin and upon the completion of the bale to transfer it with as little handling as possible to the finishing side of the press, where the bale was subjected to the final compression desired. It is obvious in such form of presses that upon completion of the preliminary bale on the bale-forming portion of the press unless some means are provided to compress or hold the top layers of the cotton below the bale-forming means or head of the press it will be impossible to successfully move the bale from its forming position to a position under the head at the finishing side of the press, as the elasticity of the compressed layers of cotton will cause the bale to spring upward as soon as the pressure is removed, and by virtue of the increase in size the bale cannot thereafter be placed beneath the head of the press on the finishing side.

With the above general defects and objections in view it is the object of my present invention to provide a press for the production of square or rectangular bales of cotton as the latter is delivered from the gin and in which upon the completion of the preliminary bale it may be at once subjected to the necessary compression on the finishing side of the press to expel the air and form the finished bale of great density.

Generally stated, my invention consists of the devices and combination of parts, as will be hereinafter more fully described, and definitely pointed out in the claims.

In the drawings, Figure 1 is a side elevation showing one embodiment of my present invention. Fig. 2 is a perspective detail showing the preferred form of compression-surfaces. Fig. 3 is a side elevation similar to that of Fig. 1, showing a modified form of my invention; and Fig. 4 is a detail in perspective of some of the modified features shown in Fig. 3.

In the present embodiment of my invention I have selected for illustration the type of cotton-press described in my former patents, Nos. 549,861 and 699,935, wherein two baling boxes or chambers are mounted upon a circular platform or turn-table, so that as the preliminary bale is being formed on one side of the press the cotton in the bale on the other side of the press may be compressed to the desired density of the finished bale, and as such general features of structure are fully shown and described in my prior patents referred to I have not deemed it necessary to multiply the illustrations and descriptions to amplify such parts in the present application.

Referring to Fig. 1, A represents any usual form of baling box or chamber mounted as described in my patents referred to and the entire mechanism being suitably supported on any desired form of framework A', which may preferably be connected to any usual form of cotton-gin, delinter, or other means for detaching fiber from the cotton-seed, the detached fiber being delivered in the usual manner through suitable conveyers or chutes $A^2$ to be delivered into the folding and compressing mechanism, (designated as a whole by the letter B.)

Below the bale boxes or chambers A are the pressing devices, as $A^3$, which are and may be the same as such devices fully described in my prior patent, No. 699,935. Mounted above the pressing devices and bale-box is the folding and compressing mechanism, comprising in the present embodiment of my invention a traveling carriage having a hopper $B^2$, into which the fiber in a fluffy state is delivered direct from the gin or other suitable machine through the conveyer $A^2$ or other desired means. The hopper $B^2$ is mounted on suitable side frames $B^3$, each preferably provided with supporting and guiding rolls $b$, traveling on the supporting-tracks C in a manner such that the entire folding and compressing mechanism may be reciprocated above the bale boxes or chamber A by suitable rack-and-gearing connection $C'$ $C^2$, deriving motion from any usual or desired form of motor.

Mounted in the side frames $B^3$ of the folding and compressing mechanism are a series of rollers D, over which pass a series of folding and pressing surfaces in the form of belts $D'$, the said belts on the series of rollers being spaced a slight distance apart to provide openings $d$, Fig. 2, for the insertion of the cut-off, to be hereinafter described. Connected to the series of belts $D'$ at one side of the hopper $B^2$ is a rod or bar $d'$, pivoted at $d^2$ to the machine-framing and operating to hold the belts or pressing-surfaces $D'$ relatively stationary thereto and to the top layers of cotton or other fiber in the bale as the folding and compressing mechanism is moved back and forth over the top of the bale, as will be fully understood by reference to my patents hereinbefore referred to without further elucidation here.

From the mechanism thus far described it will be noted that the cotton in a fluffy form being delivered into the hopper $B^2$ will descend between the two sets of folding and compressing surfaces and be condensed by them and laid back and forth in the form of a lap in the bale-box, the pressing devices $A^3$ acting to hold the bale under the desired compression during this action of the folding and compressing mechanism.

In order that the bale formed by the preliminary bale-forming mechanism thus described may be removed from the bale-forming side of the press and transferred to the finishing side, as contemplated by my prior patents referred to, it is necessary that the pressure of the bale against the folding and pressing surfaces be relieved and means be provided for holding the top layers of the bale in their compressed condition when the bale is relieved from the folding and pressing surfaces, and in the present embodiment of my invention I have devised the following means: The tracks C, on which the folding and compressing mechanism reciprocates back and forth over the top of the bale, is pivoted at $C^3$ to the supporting-framework, its opposite end being connected by a suitable flexible medium, as the cord $C^4$, to a weight W, the said flexible connection $C^4$ passing over a guide-pulley $c$, supported upon a suitable upright $c'$. Thus it will be seen that after the bale has reached the desired size the folding and compressing mechanism, carrying with it the folding and pressing surfaces or belts $D'$, may be raised from the top of the bale, and in order to maintain the material of the bale in its compressed condition when the devices described are thus raised I have provided what I will term a "cut-off" E, similar to the cut-off described in my Patent No. 699,935, and comprising a series of parallel bars, as $e$, joined together at one end and having their opposite ends free and slightly upturned, whereby the said separate arms may be inserted into the spaces $d$ between the belts or surfaces $D'$ above the top of the bale and be secured to the bale-box in any suitable manner, so that as the compressing-surfaces are raised from the bale the material of the bale will remain held in its compressed condition.

As a means for holding the cut-off E in position on top of the bale when the pressing-surfaces are raised I have provided as one of the many devices that might be used for this purpose a series of hooks $g$, which may, if desired, be connected to the eccentrics $g'$, having handles $g^2$, whereby the hooks may be engaged with the bars $e$ of the cut-off and then be drawn downwardly on top of the bale. The hooks or other holding devices for the cut-off are duplicated on opposite sides of the bale-box, and while I have shown the eccentrically-operated hooks as one of the means for performing this function it is obvious, of course, that I may employ any desired means that will serve to hold the cut-off in place on top of the bale, and thus hold the material of the bale in compressed condition when the folding and pressing surfaces are raised therefrom.

Instead of raising the entire folding and compressing mechanism as I have described with relation to Fig. 1 the same result—namely, the release of the bale from the pressing-contact with such pressing-surfaces—may be secured by other means—as, for instance, that shown in Fig. 3, wherein one of the series of rolls D, carrying the belts $D'$, is shown as mounted upon a bar F, connected to the side frame $D^3$ of the folding and compressing mechanism by parallel links F', the said links being pivoted at $f$ in usual manner, so that the entire set of rolls carrying the pressing surfaces or belts D' may be swung to one side, as represented by the dotted-line position in Fig. 3, and so relieve the top of the bale from contact with the folding and pressing surfaces. In order that the folding and pressing surfaces carried by the rolls D in this modified form of construction may be maintained in their proper position for laying the lap of material back and forth on top of the bale and against the compression of the pressing devices $A^3$, as usual, I have provided catches G, pivoted at $g^{10}$ to a suitable projection $g^{11}$ of the side frame $B^3$, the said catches G being adapted to swing on their pivots $g^{10}$ to hold the parallel links F' in position, as indicated in Fig. 4, or to be swung on their pivots to one side by means of the handle $g^{12}$, so that the parallel links may be moved and the rolls and belts be carried to the dotted-line position, as represented in Fig. 3.

In connection with the modified form of construction just described with relation to Figs. 3 and 4 the usual hooks $g$, attached to the bale-box, may be used.

From the construction thus far described it will be understood that as the fiber is delivered in the hopper $B^2$ in the fluffy condition and the folding and compressing mechanism is reciprocated by operating means through the rack C' and pinion $C^2$ the fiber is fed between the two contiguous end rolls of the folding and pressing surfaces and laid back and forth in the bale-box in the form of a lap, the said laps or bales being held in compressed condition against the folding and pressing surfaces by means of the usual pressing devices $A^3$. When the bale has assumed the proper size and proportions, the cut-off is introduced above the top of the bale and secured to the bale-box by suitable hooks or other means $g$, the compressing-surfaces being then raised from the top of the bale, thus leaving the bale held in this compressed condition by means of the cut-off E, sufficient clearance being given between the head-block and the top of the bale to permit the cut-off to be removed when the bale is transferred to the finishing side of the press.

While I have shown the conveyer $A^2$ as a mere chute for the fiber, it is to be understood, of course, that any usual form of such devices may be used, and likewise the folding and compressing mechanism may be varied between wide limits.

In order that the track C may be held in its proper position during the compression of the compressing devices $A^3$, I may, if desired, provide a catch or screw $m$ for holding the said track in lowered position.

Having thus described my invention, what I claim as new, and desire to secure by Letters Patent, is—

1. In a cotton-press, the combination of bale-forming mechanism, devices adapted for insertion between the bale-forming mechanism and top of the bale after the formation of the latter for holding the bale in its compressed condition, and means for raising the bale-forming mechanism from the bale to permit the latter to be moved from under the same.

2. In a cotton-press, the combination of bale-forming mechanism, a cut-off for insertion between the bale-forming mechanism and top of the bale after the formation of the latter, means for holding the cut-off upon the top of the bale, and devices for moving the bale-forming mechanism from contact with the top of the bale to permit the latter to be moved from under the same.

3. In a cotton-press, the combination of a preliminary bale-forming mechanism, devices for acting upon the top of the bale to hold the same in position after the formation of the bale, means for thereafter moving the preliminary bale-forming mechanism from contact with the top of the bale, and a counterweight sustaining the bale-forming mechanism.

4. In a cotton-press, the combination of a folding and compressing mechanism, means for reciprocating said mechanism for laying material into the form of a bale, a cut-off adapted to be inserted between the folding and compressing mechanism and the top of the bale, means for holding the cut-off in place on top of the bale to maintain the material of the bale in compressed condition, and means for raising the folding and compressing mechanism from the bale to permit the same to be removed therefrom.

5. In a cotton-press, the combination of folding and compressing mechanism having folding and pressing surfaces, a cut-off adapted to be inserted between the said mechanism and top of the bale after the formation of the latter, means for holding the cut-off against the top layers of the bale, and means for removing the folding and pressing surfaces from the top of the bale to permit the latter to be removed therefrom.

6. In a cotton-press, the combination of folding and compressing mechanism, a track on which said mechanism is movable, means for reciprocating said mechanism, a cut-off adapted to be inserted between said mechanism and the top of the bale after the formation of the latter, devices for connecting the cut-off to the bale-box to hold the bale in compressed condition said track being pivotally mounted to permit the folding and compressing mechanism to be raised from the top of the bale, substantially as described.

7. In a cotton-press, the combination of bale-forming mechanism, devices adapted for insertion between the bale-forming mechanism and top of the bale after the formation of the latter for holding the material of the bale in its compressed condition, and means for relatively separating the bale-forming mechanism and bale in a substantially vertical direction after the insertion of said devices to permit the bale and bale-forming mechanism to be relatively moved in a substantially horizontal direction.

ABNER D. THOMAS.

In presence of—
 JNO. W. HOUSE,
 W. H. RAGLAND.